3,143,447
Patented Aug. 4, 1964

3,143,447

CHEMICAL ETCHES FOR LEAD TELLURIDE CRYSTALS

Marriner K. Norr, Arlington, Va., assignor to the United States of America as represented by the Secretary of the Navy No Drawing. Filed Dec. 22, 1960, Ser. No. 77,764
7 Claims. (Cl. 156—17)
(Granted under Title 35, U.S. Code (1952), sec. 266)

The invention described herein may be manufactured and used by or for the Government of the United States of America for governmental purposes without the payment of any royalties thereon or therefor.

This invention relates to a method of quality control of semi-conductor materials; more specifically, it relates to a method of etching lead telluride crystals.

Lead telluride is a well known semi-conductor material and is used in many applications, for instance in thermoelectric generators, refrigerators, etc. Polycrystalline lead telluride material has been almost exclusively used because the perfection of such material is not important in most applications, and its cheaper cost was the deciding factor.

Single crystals of lead telluride are preferred, however, because of their improved electrical properties over the polycrystalline material, particularly with regard to carrier mobility and carrier lifetime. Moreover, single crystals of the material are very useful in studying scientifically its fundamental properties.

No simple test has existed heretofore for determining the degree of perfection of the crystalline structure of lead telluride single crystals; such determination could be done by use of X-ray diffraction techniques, but the cost would be prohibitive.

Accordingly it is an object of this invention to provide a simple method for determining the degree of perfection of single crystals of lead telluride.

Another object is to provide a method of etching single crystals of lead telluride.

Other objects and many of the attendant advantages of the instant invention will be readily apparent from a detailed consideration of the description which follows.

The objects of this invention are accomplished by treating the surface of the crystal to be tested with an etching solution containing iodate and hydroxyl ions. Upon being so treated, characteristic pits are formed in the surface of the crystal in areas where crystalline imperfections intersect the etched surface, and are readily discernable under a microscope.

Sharp, square, pyramidal pits are produced on p-type lead telluride. Such pits are about 2–10 microns across and they occur predominately along grain boundaries, and along the traces of active slip planes. They occur also at isolated points in the surface.

Pits produced on the n-type lead telluride by the etching solution are frequently not sharp and the pit density is usually much greater than on the p-type.

The concentration of hydroxide ion employed in the instant etching solution may vary from about 5 to about 19 normal, while the strength of the iodate ion may vary from about 0.2% to about 2% by weight.

The etching solution of the instant invention is easily prepared, for example, by dissolving about 50 parts of sodium hydroxide in about 100 parts of water, and adding about 2 parts of iodine while the solution is still hot from the dissolution of the NaOH, aforementioned parts being by weight. The iodine color disappears rapidly and the final solution is colorless. Sodium hypoiodite is formed initially when iodine is added, but disproportionates to sodium iodate very rapidly.

Alternatively, for example, the etching solution is prepared by dissolving about 50 parts of sodium hydroxide in about 100 parts of 0.5% sodium iodate solution.

The surface of the crystal to be tested must be fresh, that is, it must be free from mechanical damage or chemical contamination. The preferred way to obtain a fresh surface is to cleave the crystal at some point; a small portion can be split off without destroying the crystal.

A fresh surface, when treated with the etching solution at a temperature of about 80°–100° C., will form the characteristic pits in 5–10 minutes. The pits are formed more slowly at lower temperatures however.

After the etching solution has been in contact with the fresh crystal surface long enough to produce the pits, the surface is rinsed with water, distilled water being preferred, and dried.

Then the etched surface is observed under magnification and imperfections noted. The crystal is then graded according to the use to which it is to be put.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A solution for etching lead telluride crystals consisting essentially of iodate and hydroxyl ions.

2. A solution for etching lead telluride crystals, said solution having a normality of about 5 to about 19 with respect to hydroxyl ion, consisting essentially of hydroxyl ion and about 0.2% to about 2% by weight of iodate ion.

3. The method of determining the degree of perfection of a fresh surface of a lead telluride crystal which comprises treating said surface with a single solution consisting essentially of iodate and hydroxyl ions and rinsing said treated surface after a predetermined time with a solvent for said iodate and hydroxyl ions whereby characteristic pits are formed in said surface in areas of intersection of crystalline imperfection.

4. The method of determining the degree of perfection of a fresh surface of a lead telluride crystal which comprises treating said surface with a single solution consisting essentially of iodate and hydroxyl ions, said solution being about 5 to 19 normal with respect to hydroxyl ion and containing about 0.2 to 2 percent by weight of iodate ion, and rinsing said treated surface after a predetermined time with a solvent for said iodate and hydroxyl ions whereby characteristic pits are formed in said surface in areas of intersection of crystalline imperfection.

5. The method of claim 4 in which said solution is at a temperature of 80–100° C.

6. The method of determining the degree of perfection of a fresh surface of a lead telluride crystal which comprises treating said surface, at a temperature of about 80–100° C., with a single solution consisting essentially of about 50 parts sodium hydroxide dissolved in 100 ml. of a solution of about 0.5 percent by weight sodium iodate and rinsing said treated surface after a predetermined time with a solvent for said iodate and hydroxyl ions whereby characteristic pits are formed in said surface in areas of intersection of crystalline imperfection.

7. The method of determining the degree of perfection of a fresh surface of a lead telluride crystal which comprises treating said surface with a single solution consisting essentially of 50 percent by weight sodium hydroxide and 2 grams of iodine per 100 ml. of solution and rinsing said treated surface after a predetermined time with water whereby characteristic pits are formed in said surface in areas of intersection of crystalline imperfection.

References Cited in the file of this patent

UNITED STATES PATENTS

| | | |
|---|---|---|
| 2,822,250 | Nobel | Feb. 4, 1958 |
| 2,858,730 | Hanson | Nov. 4, 1958 |
| 3,041,226 | Pennington | June 26, 1962 |